Feb. 26, 1963 R. W. BISHOP ET AL 3,078,904
PINCH-OFF TOOL
Filed Feb. 2, 1961 2 Sheets-Sheet 2
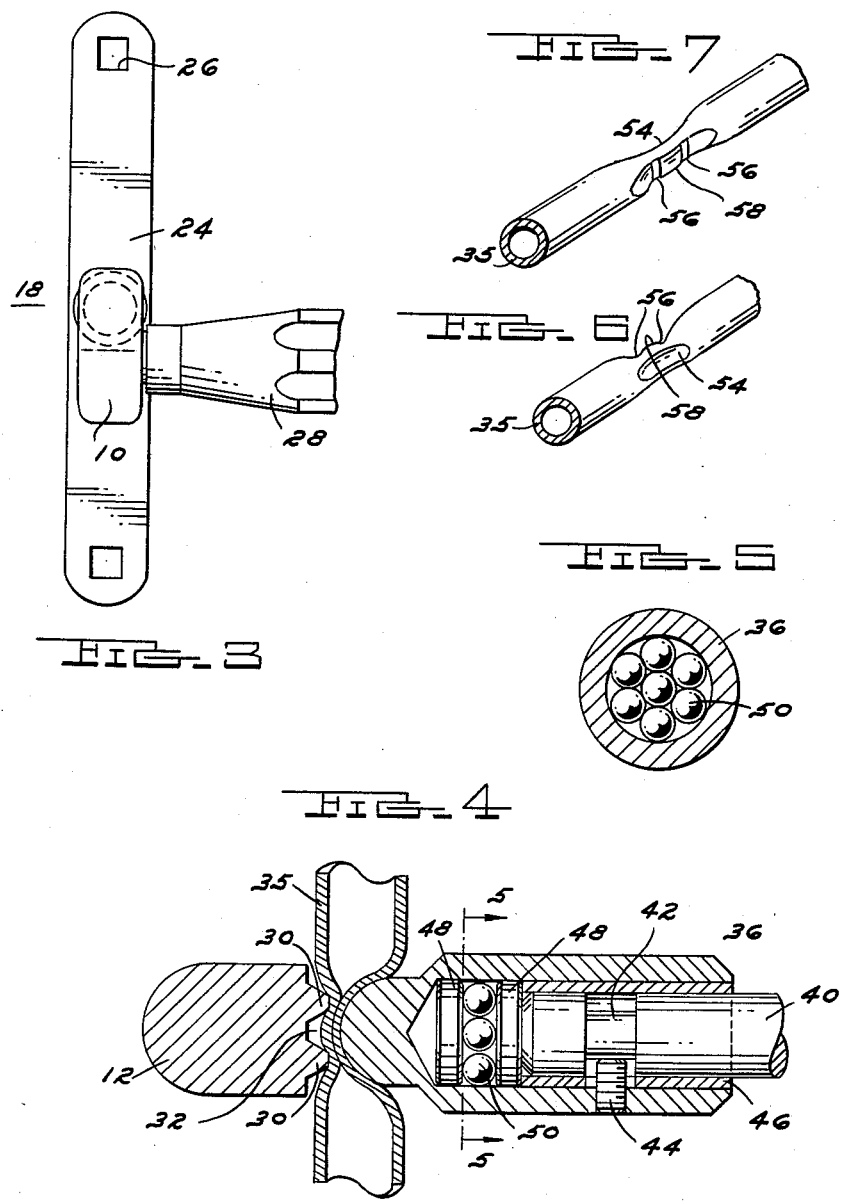
INVENTORS
ROBERT W. BISHOP
CHARLES H. O'GRADY
BY
Burton & Parker
ATTORNEYS United States Patent Office 3,078,904
Patented Feb. 26, 1963

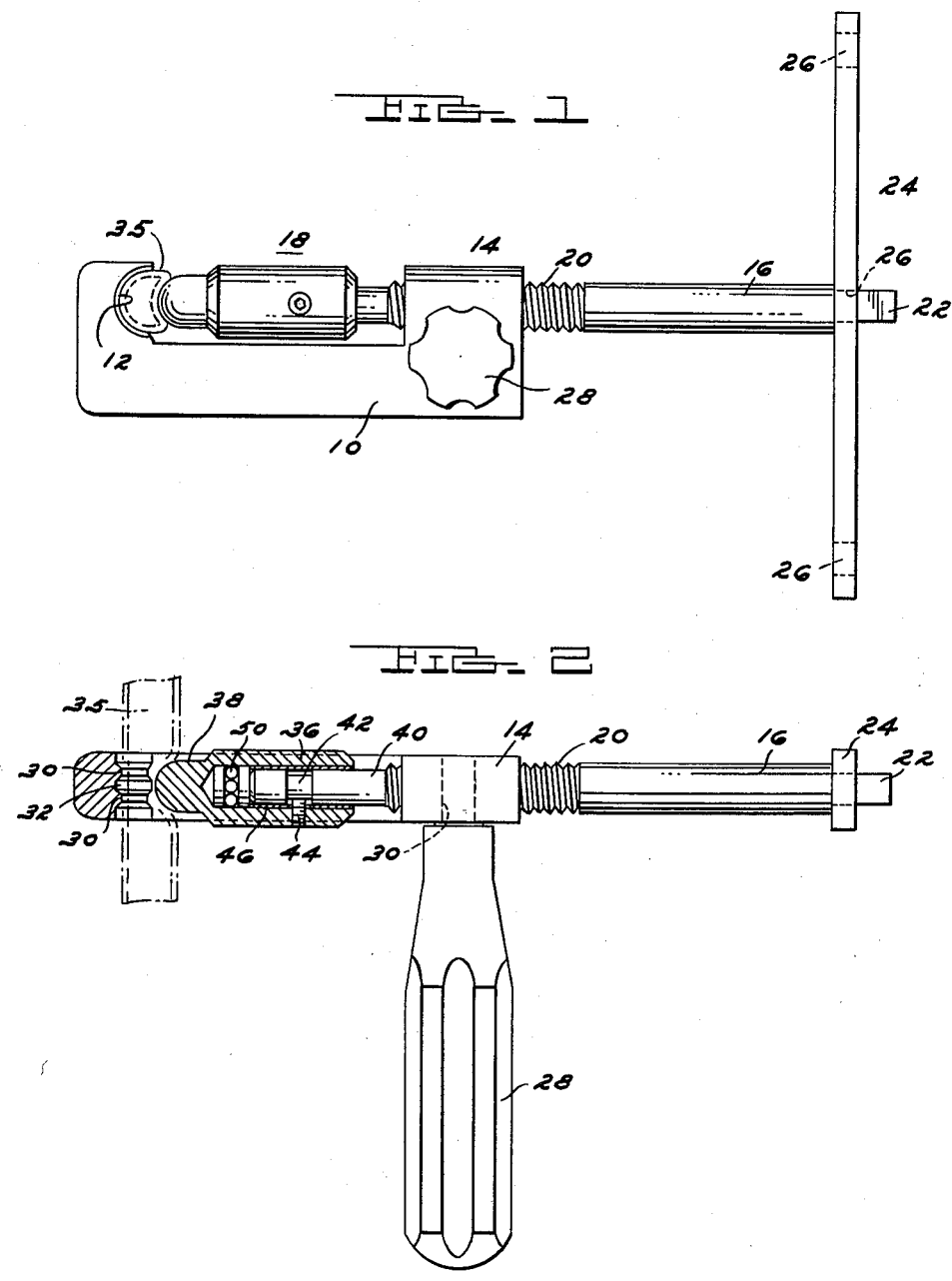

3,078,904
PINCH-OFF TOOL
Robert W. Bishop, Bryan, and Charles H. O'Grady, Williams, Ohio, assignors to Kent-Moore Organization, Inc., Warren, Mich., a corporation of Michigan
Filed Feb. 2, 1961, Ser. No. 86,721
2 Claims. (Cl. 153—24)

This invention relates to a tube pinch-off tool.

An object is to provide a pinch-off tool adapted to be used to pinch the wall of a tube so tightly together as to seal the same and which is particularly designed for use with a process tube of a mechanical refrigerating mechanism so as to seal it pressure-tight in order that a device coupled therewith, such as a charging device, can be disconnected and the process tube thereafter silver soldered shut or otherwise permanently sealed. The pinch-off tool is therefore designed to produce a temporary sealing in order to permit permanent seal to be effected without leakage.

Another object is the provision of a pinch-off tool of the character described which is simple, inexpensive, and readily adapted for use and comprises a minimum number of structural parts.

A meritorious feature of this tube pinch-off tool is that it is adapted for use with process tubes of soft metal such as copper, and the seal produced thereby is secure and tight and is accomplished with a minimum of danger of accidentally pinching the process tube so tightly as to break it off. In other words, the pinch-off tool operates effectively to accomplish its desired function without appreciable danger of rupturing or breaking the tube acted upon.

A meritorious feature resides in the provision of a pinch-off tool of the character described wherein there is an anvil portion against which a tube may be seated and a hammer portion shiftable to exert pressure upon the tube to compress the walls together to effect a tight seal and which hammer portion is so formed and supported and which anvil portion is so shaped that the tube is sealed together along two substantially parallel lines.

A further meritorious feature is that the anvil portion of the tool is provided with a plurality of substantially parallel arcuate anvil ribs spaced apart by an intervening channel and the hammer portion which exerts the pressure on the tube urging it against the anvil is ball shaped and adapted to press the tube against the anvil ribs while the ball is permitted limited shiftable movement to center it with respect to the ribs as it is urged toward the anvil.

Other objects, advantages and meritorious features will more fully appear from the following description, claims, and accompanying drawings wherein:

FIG. 1 is a side elevation of the tool in operation.

FIG. 2 is a plan view of the tool shown in FIG. 1 partly in section and showing the operation of pinching off the tube further advanced than in FIG. 1.

FIG. 3 is an end view of the tool taken from the end opposite to the anvil.

FIG. 4 is a fragmentary cross-sectional view through the anvil end of the tool and the hammer end of the pressure member.

FIG. 5 is a cross-sectional view taken on the line 5—5 of FIG. 4.

FIG. 6 is a perspective of a fragment of a tube from one side at the pinch-off point.

FIG. 7 is a perspective of the same fragment of the tube at the pinch-off point from the opposite side.

The tool comprises a body member indicated as 10. At one end it is provided with a U-shaped anvil portion 12, here shown as of a generally arcuate contour. At the opposite end and in line with the anvil portion there is an internally threaded supporting portion 14. There is a pressure member which includes a threaded shank portion 16 having at one end a hammer or striking portion 18. The shank portion is threaded externally as at 20 to be threaded through the internally threaded supporting portion 14 of the body. The outer end of the shank may be squared as at 22 to receive a handle 24. This handle is shown as provided with squared apertures 26 receivable over the squared end of the shank to engage the same for rotation. The body itself is provided with a handle 28 which may be threadedly coupled therewith as at 30 to permit ease of manipulation.

The shank 16 is threadedly supported within the block portion 14 of the body to be rotatably adjusted toward and away from the anvil end 12 of the body. Such anvil end 12 is U-shaped as shown particularly in FIG. 1, being formed of an arcuate contour. Its anvil face is provided with two substantially parallel spaced apart arcuate ribs 30 separated by a channel 32 therebetween as shown particularly in FIG. 4. A tube such as 35 seated upon the anvil rests upon these ribs as shown in FIG. 4.

The opposed hammer end portion of the pressure member is formed as illustrated particularly in FIGS. 1, 2 and 4. It comprises a sleeve or cup-shaped cap heretofore generally indicated as 18 but which is a sleeve portion per se indicated as 36 and a ball-shaped end portion indicated as 38. The end of the shank which is received within the sleeve 36 is indicated as 40 and is of reduced diameter. It is provided with a circumferential channel or groove 42 within which a set screw 44 may be entered as shown in FIG. 2. The cap itself carries a bushing in the form of a brass sleeve or the like 46 and the end 40 of the shank is rotatable within this bushing. The bushing is apertured to permit the set screw to extend therethrough.

A ball bearing assembly is disposed within the cap between the end of the shank 40 and the bottom of the cap. It comprises two pressure plates 48 and an assembly of ball bearings 50 disposed between the plates, all as shown in FIG. 4. This constitutes a thrust bearing upon which the cap pressure is exerted against the end of the shank. The cap, therefore, or hammer element provided with a ball shaped end 38 not only is relatively rotatable with respect to the shank and permits the shank to rotate therein as it is threaded toward and away from the anvil while the ball hammer portion does not rotate, but this ball hammer portion also has limited lateral shiftable displacement with respect to the shank and with respect to the anvil by virtue of the play permitted. This permitted lateral or angular displacement permits the ball-shaped hammer to center between the ribs 30 of the anvil as pressure is exerted upon the tube.

In FIGS. 6 and 7 the shaping of the tube is best illustrated. The ball end of the hammer bears thereagainst and forms the concavity 54. The opposite side of the tube is urged against the anvil and the ribs 30 pinch the wall of the tube together along the spaced substantially parallel grooves or channels 56 with a slight relief 58 between such channel portions 56 as shown particularly in FIGS. 6 and 7.

It has been found that the seal which the tool accomplishes upon the tube is a particularly tight and secure one, and the tube is so sealed without any appreciable danger of rupture or breakage.

What we claim is:

1. A pinch-off tool comprising, in combination, a body provided at one end with an arcuate anvil portion, said anvil portion provided with two generally parallel spaced apart arcuate anvil ribs extending linearly of the arcuate anvil portion and separated by a channel therebetween, a pressure member having a ball shaped hammer portion at one end opposed to and adapted to seat upon the ribs of the arcuate anvil portion and bridge the channel therebetween, said ball shaped hammer end portion being of a size to be centered between said ribs and cooperating therewith to pinch-off a tube between each rib and the ball end portion, said channel having a depth greater than the deflection into the channel of a tube being pinched-off by the tool, said pressure member supported to have its ball shaped hammer portion moved toward and away from the arcuate anvil portion, said hammer ball end portion of the pressure member having limited angular lateral shiftable movement to center the ball end between the ribs of the anvil portion.

2. A pinch-off tool comprising, in combination, a body provided at one end with an arcuate anvil portion, said anvil portion provided with two generally parallel spaced apart arcuate anvil ribs extending linearly of the arcuate anvil portion and separated by a channel therebetween, a pressure member having a shank portion and a ball shaped hammer end portion at one end of the shank portion and said ball shaped hammer end portion opposed to and adapted to seat upon the ribs of the arcuate anvil portion, and bridge the channel therebetween and cooperate with said ribs to pinch-off a tube between each rib and the surface of said ball-shaped end portion opposed to the anvil, said channel having a depth greater than the deflection thereinto of a tube being pinched-off between the ribs and said ball-shaped end, such shank portion threadedly supported within that end of the body opposite the anvil portion for threaded adjustment to advance and wtihdraw the hammer end portion toward and away from the anvil portion of the body, said ball shaped hammer end portion being of a size to be centered between said ribs, said hammer end portion having its inner end shaped in the form of a sleeve and freely received over the adjacent end of the shank portion to permit rotation of the shank portion therein, a ball thrust bearing within the sleeve shape of the hammer end portion seated between the end of the shank and the bottom of the sleeve to take the thrust of the ball end portion toward the end of the shank, said hammer ball end portion having limited angular lateral shiftable movement with respect to the shank portion of the pressure member to center the ball end between the ribs of the anvil portion.

References Cited in the file of this patent

UNITED STATES PATENTS

| | | |
|---|---|---|
| 1,463,073 | Felten | July 24, 1923 |
| 2,072,359 | Dobrick | Mar. 2, 1937 |
| 2,285,099 | Specht | June 2, 1942 |
| 2,424,871 | Wenk et al. | July 29, 1947 |
| 2,744,429 | Seely | May 8, 1956 |
| 2,809,651 | Moberg | Oct. 15, 1957 |
| 2,948,170 | Kemp | Aug. 9, 1960 |
| 2,975,819 | Costanzo et al. | Mar. 21, 1961 |

FOREIGN PATENTS

| | | |
|---|---|---|
| 492,243 | France | Mar. 11, 1919 |